April 17, 1962 M. KATZIN 3,030,500

COMMUNICATION SYSTEM UTILIZING TRADE WIND INVERSION DUCT

Filed Jan. 15, 1959 2 Sheets-Sheet 1

INVENTOR

MARTIN KATZIN

BY Hurvitz & Rose

ATTORNEYS

COMMUNICATION SYSTEM UTILIZING TRADE WIND INVERSION DUCT

Filed Jan. 15, 1959 2 Sheets-Sheet 2

INVENTOR
MARTIN KATZIN

BY Hurvitz & Rose

ATTORNEYS 3,030,500
Patented Apr. 17, 1962

3,030,500

COMMUNICATION SYSTEM UTILIZING TRADE WIND INVERSION DUCT

Martin Katzin, Silver Spring, Md., assignor to Electromagnetic Research Corporation, Washington, D.C., a corporation of Maryland Filed Jan. 15, 1959, Ser. No. 787,037
6 Claims. (Cl. 250—6)

The present invention relates generally to systems and methods of radio communication, and more particularly to novel systems and methods of communication by means of VHF radio waves, wherein the usually accepted limitations on feasible ranges of communication are overcome.

The present invention utilizes meteorological characteristics of certain regions of the atmosphere in a manner which allows communication ranges to be obtained which extend for several thousand miles across the oceans, whereby intercontinental communication may be achieved. Furthermore, these ranges may be attained without the use of very high power transmitters, as is normally the case for beyond-the-horizon transmission. Since the ionosphere is not called into play in the method of the present invention, the band-width which may be transmitted without distortion is very great, so that the invention may be used for intercontinental television transmission, or for the simultaneous transmission of a large number of high-speed telegraph, facsimile or telephone channels.

Present techniques and applications of long-distance communication make use of frequencies which can be propagated via the ionosphere. Such transmissions are subject to fading and distortion, and to prolonged interruptions by disturbances of the ionosphere. VHF and higher frequencies, however, ordinarily are not propagated via the ionosphere, and so are not affected by ionospheric disturbances.

The atmosphere is known to undergo meteorological conditions in which bending of radio waves can occur, so that ranges greater than normal line-of-sight ranges are obtainable at times. Such conditions occur, for example, off the coasts of large land masses when warm air blows out over the cooler water. Under such conditions ranges of up to about 200 miles are obtainable. However, these conditions usually are found only in favorable climatological regions, and then only for limited periods of time.

The so-called ocean duct is a persistant low altitude mechanism which enhances the transmission range for waves launched at very small heights over the surface of the ocean. However, because of its low height, it is effective only for frequencies greater than about 6000 megacycles, and the usual roughness of the ocean scatters energy out of the duct so that ranges of only 150–200 miles are obtainable with beamed transmissions.

The principle of the present invention in distinction to those above referred to, is to utilize the transoceanic circulation of air in the trade wind belts as a region of favorable radio transmission characteristics. The trade winds are very stable and blow virtually throughout the year. Overlying the trade winds is the trade inversion, which is due to dry subsiding air, and forms a stable blanket which inhibits the upward motion of moist air from below. At the level of the inversion sharp increases of temperature and variations of moisture content of the air takes place. These meteorological phenomena form strong elevated ducts which are persistent and stable. Furthermore these ducts extend entirely across the oceans. In order to make use of ducts of the type described for long-range communications, systems designed in accordance with the principles of the present invention have their antennas elevated so that they are in a duct. This may be accomplished by supplying the antennas by means of tethered balloons, or on aircraft. The elevated systems may then be coupled to terminal systems on the ground by radio link.

Since the meteorological ducts hereinabove described are completely elevated and the radio waves are substantially confined therein, by disposing the antennas within the ducts scattering by the rough surface of the ocean is avoided. Consequently the attenuation of the waves is very low, so that extreme ranges are obtainable with low power.

In accordance with the present invention, the end achieved by elevating the antennas is to confine the radio waves to the region of the atmosphere most effective for long-distance transmission, rather than merely to increase the line-of-sight distance. Typical inversion heights, at which meteorological ducts exist, are in the range 2000 to 5000 feet, which would result in line-of-sight range of the order of 200 miles. At the ranges which the present invention renders feasible, antennas at such heights would be far below the horizon. For example, at a range of 1500 miles, the receiving antenna would be over 150 miles below the horizon line of the transmitting antenna.

In order to insure that the antennas are kept within the inversion layer, so that optimum transmission conditions can be maintained, temperature-responsive elements may be included above and below airborne carriers for antennae, which are included in a bridge circuit arranged to control automatically the height of the carrier.

Connection of the transmitter and receiver to their respective ground stations is achieved preferably by radio link. Directive antennas may be used for the terminals of this link in order to reduce power requirements and the possibility of interference. Since aircraft flying in the neighborhood of the airborne transmitting or receiving antennae may interrupt the circuit when flying across the path, a diversity arrangement utilizing duplicate airborne transmitting and receiving terminals may be used when extreme reliability is desired.

It is, accordingly, a broad object of the present invention to provide a system of long range communication employing trade wind inversion ducts.

It is another object of the invention to provide a system of communication between elevated vehicles, wherein the vehicles are maintained in elevated ducts due to trade wind inversions.

The above and still further objects, features and advantages of the present invention will become apparent upon consideration of the following detailed description of one specific embodiment thereof, especially when taken in conjunction with the accompanying drawings, wherein.

Figures 1, 2, 3:
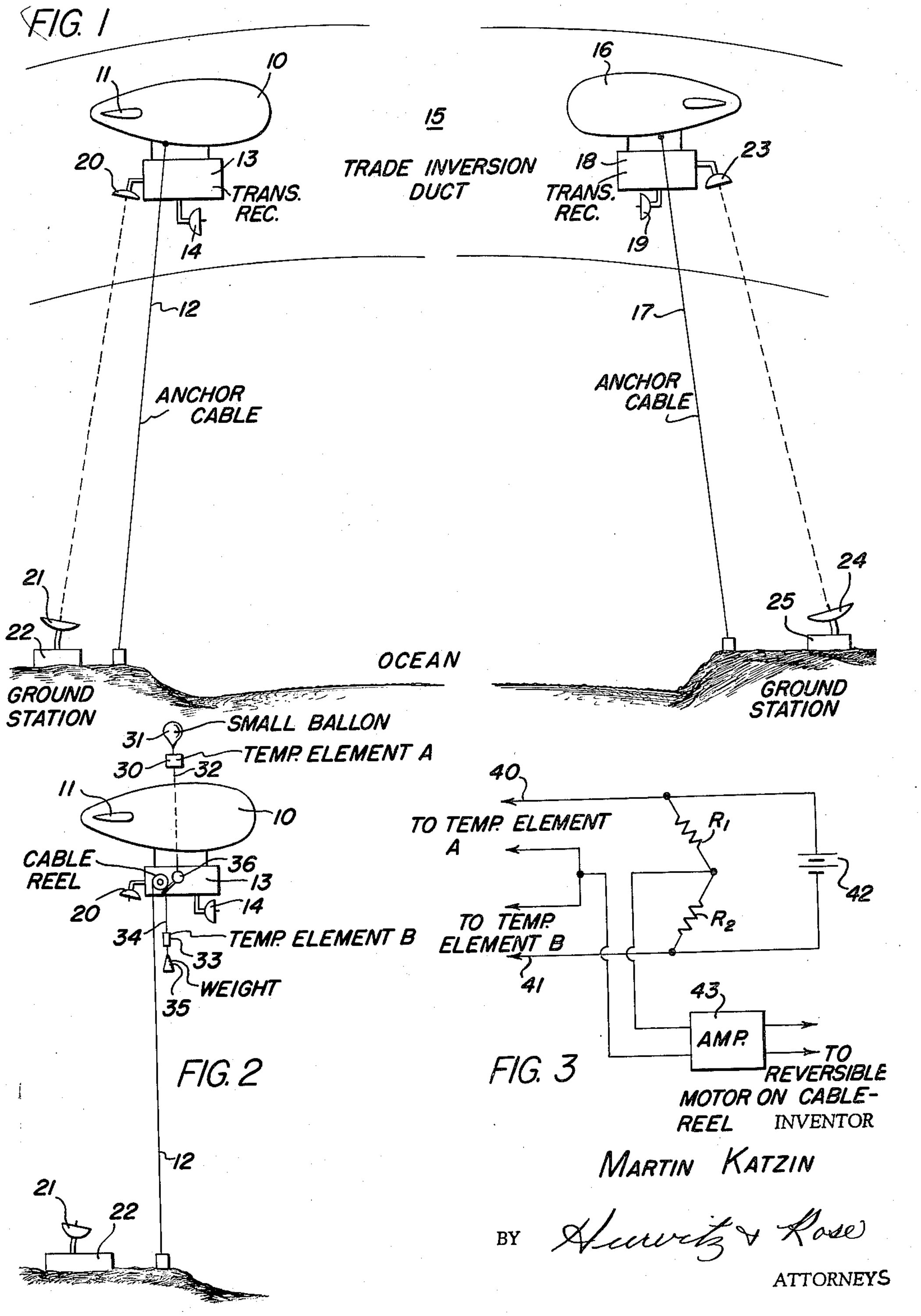
FIGURE 1 is a schematic representation of a system of communication according to the invention, employing lighter than air vehicles tethered in a trade wind inversion duct.
FIGURE 2 is a schematic representation of a modification of the system of FIGURE 1, wherein is provided devices for automatically maintaining the vehicles within a trade wind inversion duct.
FIGURE 3 is a schematic circuit diagram of a motor control circuit utilized in the system of FIGURE 2.
Figure 4:
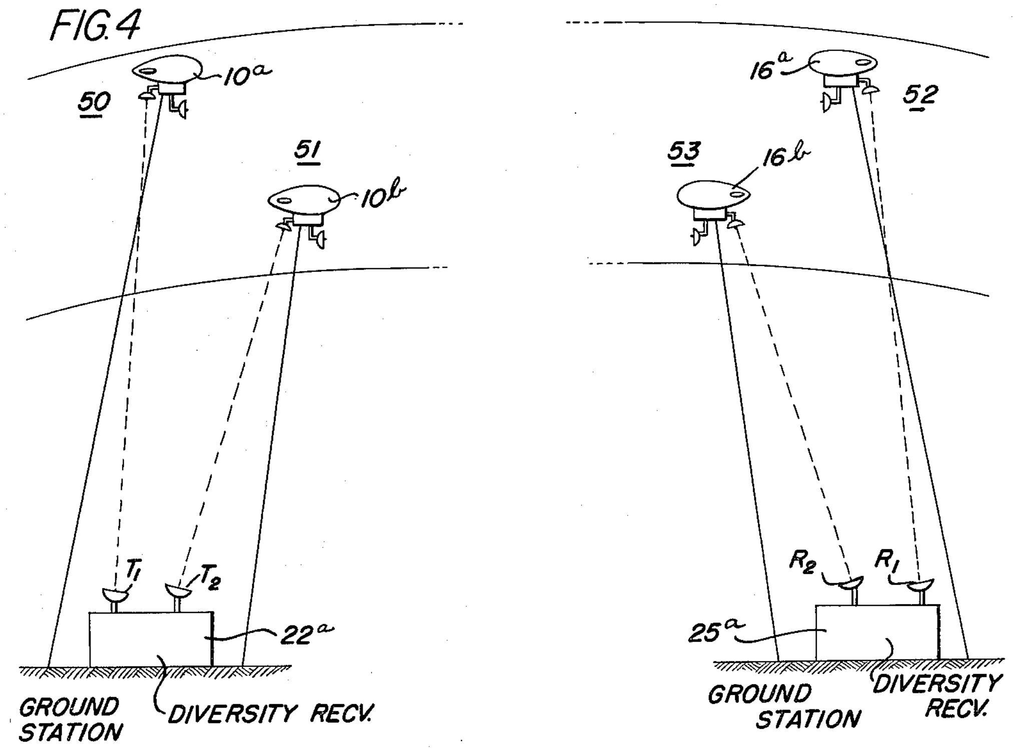
FIGURE 4 is a schematic representation of a modification of the system of FIGURE 1, employing diversity reception principles.

Referring now more particularly to the system of FIGURE 1, the reference numeral 10 denotes a balloon, generally of elliptical shape and having stabilizer fins 11 for maintaining the ballon stabilized in elevation. Reliance may be placed on prevailing winds to maintain azimuthal stability.

The balloon 10 is anchored to ground by means of an anchor cable 12 at such a height that it is located within a trade inversion duct. Suspended from the balloon is a cabin or gondola 13 containing a radio transmitter and receiver, and suspended under the cabin 13 is a directive antenna 14, of any conventional and desired character per se, which is mounted so as to transmit a beam of radiant energy into and in the direction of the trade inversion duct, generally indicated by the reference numeral 15.

A similar balloon 16, anchored to ground by means of an anchor cable 17, is located remotely of the balloon 10, the anchor cable 17 being arranged to maintain the balloon 16 within the trade inversion duct 15. Suspended from the balloon 16 is a cabin 18 containing a radio transmitter and receiver, and suspended from the cabin 18 is a directional antenna 19 which is arranged to transmit a directive beam toward the antenna 14. The antenna 14 is connected with the transmitter and receiver in the cabin 13 in transmit-receive relationship, so that it may be employed for either reception or transmission, in accordance with techniques well understood in the art of radio repeating. The antenna 19 is similarly related to the transmitter and receiver in the cabin 18.

On the basis stated personnel in the cabins 13 and 18 would be able to communicate with each other over the radio link which includes trade inversion duct 15, and duct action provides for extremely long range communication over wide bands with very small power. Ranges of over 1500 miles may be expected with but a few watts of transmission energy and intercontinental communication across oceans is feasible.

In order to enable communication between stations located on the ground, a radio relay link is provided at each end of the communication channel. One link extends from the transmitter and receiver in the cabin 13 and employs a directive antenna 20 mounted on the cabin 13. The antenna 20 is directed downwardly to a similar antenna 21 associated with a ground station 22. An antenna corresponding with antenna 20 and identified by reference numeral 23 is mounted on the cabin 18 and is directed toward a complementary antenna 24 associated with a ground station 25.

In operation, when the balloons 10 and 16 have been raised so that they both lie within the trade inversion duct 15, messages may be transmitted from the ground station 22 via antenna 21, to the antenna 20 mounted on the cabin 13. Messages received by the antenna 20 are retransmitted via the antenna 14 into the trade inversion duct 15, toward antenna 19, and are received by the antenna 19. Signals received by the antenna 19 are transmitted to ground station 25 via a link including antennas 23, 24. Transmission in the reverse direction is obviously also feasible over the same channels.

The problem of maintaining the antennas 14 and 19 always face to face may be solved in various fashions. In one form of the invention, directive transmissions may be dispensed with so that a link exists between the two ends of the communication channel regardless of attitude of the ballons 10 and 16. However, well known techniques are available for maintaining antennae in desired azimuthal directions, as by gyroscopically controlling the antennas. While I have shown directive links throughout it will be appreciated that for crude, relatively inefficient systems directive transmissions may be dispensed with consequent increase in required transmitted power, while transmitted power may be decreased by employng directive antennas at the cost of providing mechanism for suitably directing the antennas.

While I have disclosed the present invention, in the embodiment of FIGURE 1 of the accompanying drawings, as employing balloons it will be evident that heavier-than-air craft, i.e., airplanes, may be employed in place of the balloons for sustaining the radio equipment within the trade inversion duct 15, and that they may orbit continuously within the duct while transmitting and receiving.

The system of FIGURE 2 corresponds broadly with the system of FIGURE 1, and corresponding elements have accordingly been identified by corresponding reference numerals. In the system of FIGURE 1 it was assumed that the location of the trade inversion duct was known, and that consequently balloons could be tethered therein. In the system of FIGURE 2 provision is made for automatically maintaining balloons within the trade inversion duct by making use of meteorological characteristics of the duct.

Figure 5:
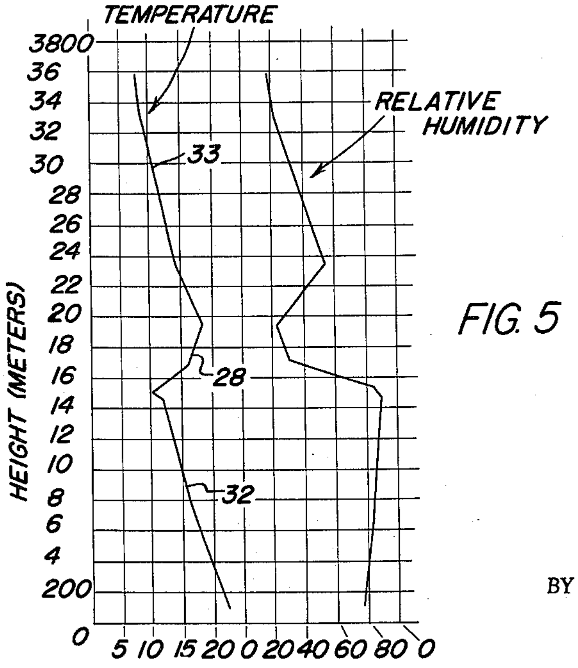
FIGURE 5 is a graph showing variations of temperature and relative humidity with altitude, within a temperature inversion duct.

Referring now to FIGURE 5 of the accompanying drawings, there is provided two graphs showing temperature variations as a function of altitude within and outside of a trade inversion duct, as well as relative humidity as a function of altitude within that duct, and outside the duct. The temperature graph shows that temperature generally decreases with increasing altitude except for a small portion 28 at about 1500–2000 meter altitude level, where a decrease with altitude occurs. Above this a gradual decrease with altitude is found. The mid region 28 is the trade inversion duct characterized by a temperature inversion, i.e., an increase of temperature with increasing altitude. The graph of relative humidity contains two portions of opposite slope joined by a rather irregular portion having at least three distinct slopes. The temperature-altitude characteristic of the duct is found to be more suitable for controlling altitude than is the relative humidity characteristic. However, either may be utilized.

In the system of FIGURE 2 a temperature sensitive element 30 is maintained above the balloon 10 as by means of a small supplementary balloon 31, arranged to exert upward pull on the temperature sensitive element 30. The latter is tethered to the balloon by means of a cable 32. A further temperature sensitive element 33 is suspended from the cabin 13 by means of a free hanging cable 34, suitable weight 35 being added to assure tautness of the cable 34. Suitable wiring is provided between the temperature sensitive elements 30, 33, hereinafter referred to sometimes as the A and B elements, and an electric motor controlled reel generally indicated by the reference numeral 36, controls the length of cable 12. The temperature sensitive elements A and B, as long as they are wholly on either the portion 32 or the portion 33 of the temperature-altitude graph of FIGURE 5, measure a fixed algebraic temperature difference. Should the elements A and B fall on the portion 28 of the graph an opposite algebraic temperature is measured. In general, a balloon will be tethered so as to fall entirely within area 28. If the B element falls in the portion 32, and the A element in portion 28 of the graph, the balloon will tend to rise so that both elements arrive in the portion 28. If the A element falls in portion 33 and the B element in portion 28, the balloon will fall.

A suitable reel motor control circuit is represented schematically in FIGURE 3 of the accompanying drawings. Input from temperature sensitive elements A and B is provided at terminals 40 and 41 respectively, the temperature sensitive elements forming arms of a Wheatstone bridge. The remaining arms of the bridge are R1 and R2, which are of such relative size that balance occurs when the elements A and B, have the differences of resistance represented by the slope of the portion 28 of the temperature graph taken with the physical distance apart of the elements A and B. Power is supplied to the bridge in conventional fashion by means of a source 42. The output of the bridge is supplied to an amplifier 43, the output of which in turn controls the reel motor in a fashion which is well known in the motor control art. Any material disturbance of the preselected temperature relationships of elements A and B will accordingly result in rotation of the motor in one sense or another until the desired temperature relationship has been re-established as indicated by re-balance of the bridge. By spacing the temperature sensing elements A and B sufficiently from the balloon, a relatively large bridge unbalance will occur long before the balloon can escape from the duct.

The system of FIGURE 1, or any modification thereof employing heavier-than-air craft, or any modification thereof employing automatic control of balloon altitude in accordance with meteorological characteristics as a function of altitude found within the trade inversion duct, is subject to interruption of service due to sudden shift of the duct, unforeseeable changes of balloon altitude due to gusts of wind, or due to intervening aircraft or the like. In order to provide for more reliable communication resort may be had to diversity principles of radio communication.

More specifically, two systems 50 and 51, each corresponding with the equipment employed in the system of FIGURE 1, may be employed at a first station, and two corresponding systems 52 and 53 at a second remote station. The systems 50, 51 may be duplicate, in general, except that the balloons 10*a* and 10*b* of systems 50, 51 may be tethered at different locations within the duct, either transversely or in respect to altitude, or both, and the same expedient may be adopted at the remote station in respect to the balloons 16*a* and 16*b*. If desired the separate transmissions at each station may transmit on different frequencies and may relay to ground on different frequencies, although this is not essential. The ground stations 22*a* and 25*a* may then be arranged to include separate receivers for the separate channels, the outputs of the receivers being combined in a diversity combiner which automatically selects that one of the received signals which is of superior quality. The general techniques of diversity reception are well known and accordingly have not been indicated in detail. In general any of the known types of diversity reception may be employed.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A system of communication operating at a frequency above thirty megacycles, comprising means for launching at least one radio signal wave in an elevated trade wind inversion duct having a lower boundary elevated at least one hundred feet above the earth's surface, means for collecting said at least one radio signal wave within said trade wind inversion duct, and means for automatically positioning said means for launching and said means for collecting within said duct.

2. The combination according to claim 1 wherein said means for automatically positioning includes means for sensing temperatures at said means for launching and at said means for collecting.

3. The combination according to claim 1 wherein said means for automatically positioning includes means for measuring at least one atmospheric characteristic and for automatically controlling altitude in response to said means for measuring.

4. The combination according to claim 3 wherein said means for measuring at least one atmospheric characteristic is a plurality of vertically separated temperature sensing devices and means for determining the difference of temperatures measured thereby.

5. A system for maintaining a radio communication device within a trade wind inversion duct, comprising first means for measuring an atmospheric parameter at a point located above said device, second means for measuring said atmospheric parameter at a point located below said device, and means for comparing the outputs of said first and second means differentially to obtain a signal representative selectively of location of said device within and outside said duct.

6. The combination according to claim 5 wherein each of said first and second means is a temperature responsive device having as output an electrical signal representative of temperature.

References Cited in the file of this patent

UNITED STATES PATENTS

| | | |
|---|---|---|
| 2,431,018 | Bailey | Nov. 18, 1947 |
| 2,504,884 | Schock | Apr. 18, 1950 |
| 2,542,823 | Lyle | Feb. 20, 1951 |
| 2,579,591 | Ley et al. | Dec. 25, 1951 |
| 2,598,064 | Lindenblad | May 27, 1952 |
| 2,626,348 | Noble | Jan. 20, 1953 |
| 2,627,021 | Hansell | Jan. 27, 1953 |
| 2,748,266 | Boyd | May 29, 1956 |

OTHER REFERENCES

Principles of Radar, editor of 2nd edition Reintjes, 1946, chapter 9, pages 113–116.

"Possibilities of Stratovision," by Sleeper, FM & Television Magazine, August 1948, pages 15–17 and 45.

Electronic and Radio Engineering, Terman, 1955, 4th edition, pages 818–823.